(12) United States Patent
Benson et al.

(10) Patent No.: US 7,521,516 B2
(45) Date of Patent: Apr. 21, 2009

(54) SOLUBLE POLYMERS AS AMINE CAPTURE AGENTS AND METHODS

(75) Inventors: Karl E. Benson, St. Paul, MN (US); G. Marco Bommarito, Stillwater, MN (US); Albert I. Everaerts, Oakdale, MN (US); Brinda B. Lakshmi, Woodbury, MN (US); Charles M. Leir, Falcon Heights, MN (US); George G. I. Moora, Afton, MN (US); Lang N. Nguyen, St. Paul, MN (US); Rahul Shah, Woodbury, MN (US); Peter A. Stark, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/968,953

(22) Filed: Jan. 3, 2008

(65) Prior Publication Data

US 2008/0132665 A1    Jun. 5, 2008

Related U.S. Application Data

(62) Division of application No. 11/015,399, filed on Dec. 17, 2004, now Pat. No. 7,342,082.

(51) Int. Cl.
*C08F 128/02* (2006.01)
(52) U.S. Cl. ............ 526/287; 526/286; 526/307.3
(58) Field of Classification Search ........... 526/287, 526/286, 307.3
See application file for complete search history.

(56) References Cited

U.S. PATENT DOCUMENTS

| | | | |
|---|---|---|---|
| 3,442,815 A | 5/1969 | Rauhut et al. | |
| 3,801,533 A | 4/1974 | Tetenbaum et al. | |
| 4,233,029 A | 11/1980 | Columbus et al. | |
| 5,583,114 A | 12/1996 | Barrows et al. | |
| 5,587,513 A | 12/1996 | Pohmer et al. | |
| 5,674,742 A | 10/1997 | Northrup et al. | |
| 5,700,612 A | 12/1997 | Kato et al. | |
| 5,874,500 A | 2/1999 | Rhee et al. | |
| 6,156,270 A | 12/2000 | Buechler et al. | |
| 6,369,893 B1 | 4/2002 | Christel et al. | |
| 6,573,338 B2 | 6/2003 | Halverson et al. | |
| 6,656,428 B1 | 12/2003 | Clark et al. | |
| 7,169,933 B2 * | 1/2007 | Benson et al. | 548/207 |
| 7,179,923 B2 * | 2/2007 | Benson et al. | 548/210 |
| 2003/0170474 A1 | 9/2003 | Qiao et al. | |
| 2003/0170881 A1 | 9/2003 | Davis et al. | |

FOREIGN PATENT DOCUMENTS

| | | |
|---|---|---|
| CA | 2 369 720 | 7/2003 |
| EP | 0 010 844 | 5/1980 |
| EP | 0 177 740 | 5/1986 |
| EP | 0 446 047 | 9/1992 |
| EP | 0 535 236 | 4/1993 |
| EP | 0 657 737 | 6/1995 |
| EP | 0 814 381 | 12/1997 |
| JP | 1-114861 | 8/1989 |
| JP | 03055544 | 3/1991 |
| JP | 5-188663 | 7/1993 |
| JP | 9-54463 | 2/1997 |
| JP | 11-109630 | 4/1999 |
| JP | 2003-322860 | 11/2003 |
| WO | WO 00/16903 | 2/2000 |
| WO | WO 01/23892 | 4/2001 |
| WO | WO 02/088296 | 11/2002 |
| WO | WO 02/095940 | 11/2002 |
| WO | WO 03/068712 | 8/2003 |
| WO | WO 2004/067732 | 8/2004 |

OTHER PUBLICATIONS

Benson et al., Acousto-Mechanical Detection Systems and Methods of Use, U.S. Appl. No. 60/533,169, filed Dec. 30, 2003.
Tseng et al., J.Org. Chem., vol. 44, No. 23, 1979, pp. 4113-4116 XP-002331678.
Adams et al., Journal of American Chemical Society, 78, 3825-3828, 1956, XP-002331677.
Mustafa et al. Journal of American Chemical Society, 79, 1945-1949, 1957, XP-002331676.
Guo et al., Journal of Fluorine Chemistry, 52, 29-36, 1991, XP-002331675.
Yoshio et al., Database accession No. 1979: 492034 XP-002331680.
Toshiaki et al, Database accession No. 1995: 708887 XP-002331681.
Satoshi et al., Database accession No. 2004: 1125476 XP-00231679.
Grate et al., "Acoustic Wave Sensors" vol. 2, pp. 38-83, 1996 (XP002334970).

* cited by examiner

*Primary Examiner*—Robert D. Harlan
(74) *Attorney, Agent, or Firm*—Jean A. Lown

(57) ABSTRACT

Soluble polymers and methods for the preparation thereof, wherein the polymers of the present invention have pendant acylsulfonamide amine-reactive groups that can be used for the capture of amine containing materials.

16 Claims, No Drawings

SOLUBLE POLYMERS AS AMINE CAPTURE AGENTS AND METHODS

RELATED PATENT APPLICATION

This patent application is a divisional of U.S. patent application Ser. No. 11/015,399, which was filed on Dec. 17, 2004 now U.S. Pat. No. 7,342,082 and which is incorporated herein by reference in its entirety.

GOVERNMENT RIGHTS

This invention was made with Government support under Contract No. DAAD13-03-C-0047 awarded by the U.S. Army. The Government has certain rights in this invention.

BACKGROUND

Amine-containing materials, such as amine-containing analytes, amino acids, DNA fragments, RNA fragments, protein fragments, organelles, and immunoglobins, immobilized on the surface of a substrate can be used in numerous applications. The covalent attachment of amine-containing materials to a substrate can be accomplished, for example, by the reaction of the amine with a reactive group on the surface of the substrate. This amine-reactive functional group can be, for example, an activated acyl derivative, such as an N-hydroxysuccinimide ester; or, an active cyclic acyl compound, such as azlactone. A stable amide bond is formed from reaction of the amine with the active acyl group, either with expulsion of N-hydroxysuccinimide or ring opening of the azlactone.

Amine-reactive functional groups have been attached to substrates by specific functional group reactions with complementary substrate chemistry and by deposition of soluble polymers comprising the amine-reactive functional groups. Deposition of polymers has advantages over reactive functional groups for some substrates. Polymeric films can have adequate physical adhesion to a variety of inorganic and organic substrates without specific complementary functional groups on the substrate surface. The mechanical properties of polymeric films, such as $T_g$, can be designed for specific requirements by selection of the type of polymer and comonomers.

Although functional groups such as N-hydroxysuccinimide esters and azlactone are highly reactive with amines, they can suffer from a number of disadvantages. Many of the reactions with biological amines are conducted in dilute aqueous solutions, conditions known to cause rapid hydrolysis of N-hydroxysuccinimide esters. This competing reaction can result in incomplete or inefficient immobilization of the amine-containing materials onto the substrate.

A solution to this problem has been to use polymeric coatings based on polymers made from vinylazlactones. However, the azlactone group is synthetically incompatible with many functional groups that can be used to link it to a polymerizable vinyl group, and it is therefore most often incorporated using vinylazlactone monomers. This monomer readily polymerizes or co-polymerizes with a variety of vinyl monomers to provide solutions of polymers having pendant amine reactive azlactone substituents bonded directly to the polymeric backbone. These solutions can be coated onto substrates to obtain amine-reactive surfaces.

Thus, there exists a need for soluble polymeric materials with alternative amine reactive functional groups that can be used as coatings for the activation of surfaces for the immobilization of amine-containing materials.

SUMMARY

The present invention provides soluble polymers and methods for the preparation thereof.

The soluble polymers of the present invention have two or more pendant groups selected from those having the following formulas:

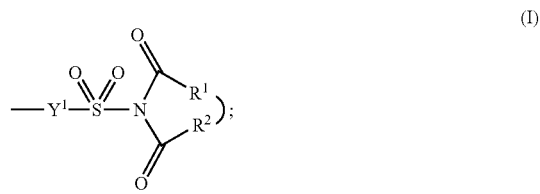

(I)

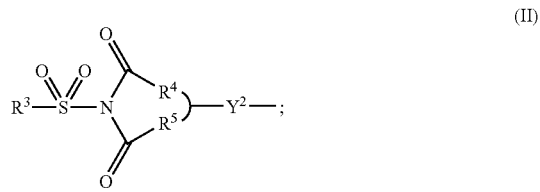

(II)

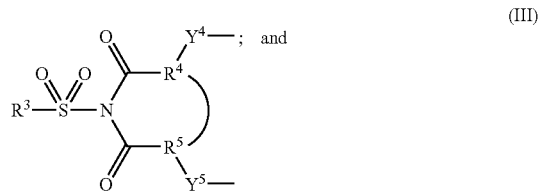

(III)

(IV)

wherein $R^1$, $R^2$, $R^3$, $R^4$, $R^5$, $R^6$, $Y^1$, $Y^2$, $Y^3$, $Y^4$, $Y^5$, and Z are defined herein below.

Polymers of the present invention have acylsulfonamide amine-reactive groups and can be used as surface treatments for the capture of amine containing materials. They can be formed into films, coatings, membranes, beads, and articles. They can also be used in solution as crosslinkers for amine-containing materials to form gels or hydrogels, for example.

These polymers can be made from monomers or by treatment of functional polymers. Useful monomers include ethylenically unsaturated monomers containing one or more functional groups that can form the pendant groups listed above. These include, for example, (meth)acrylates (i.e., methacrylates and acrylates), (meth)acrylamides (i.e., methacrylamides and acrylamides), vinyl ethers, styrenes, olefins (e.g., strained internal olefins), allyl ethers, etc.

Preferred monomers for the preparation of the polymers of the present invention include those of the formula:

wherein A is selected from the group consisting of functional groups having the following formulas:

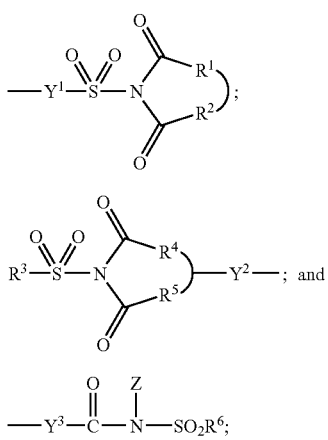

wherein, $R^1$, $R^2$, $R^3$, $R^4$, $R^5$, $R^6$, $R^7$, $R^8$, $Y^1$, $Y^2$, $Y^3$, $Y^4$, $Y^5$, X, and Z are defined herein below.

Such functionalized monomers can be co-polymerized with each other or with other ethylenically unsaturated monomers that do not include such pendant groups. These can include (meth)acrylates, (meth)acrylamides, vinyl ethers, styrenes, strained internal olefins, allyl ethers, etc.

DEFINITIONS

The terms "comprises" and variations thereof do not have a limiting meaning where these terms appear in the description and claims.

As used herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "alkyl" refers to a monovalent radical of an alkane and includes groups that are linear, branched, cyclic, or combinations thereof. The alkyl group typically has 1 to 30 carbon atoms. In some embodiments, the alkyl group contains 1 to 20 carbon atoms, 1 to 10 carbon atoms, 1 to 6 carbon atoms, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

As used herein, the term "alkylene" refers to a divalent radical of an alkane. The alkylene can be straight-chained, branched, cyclic, or combinations thereof. The alkylene typically has 1 to 200 carbon atoms. In some embodiments, the alkylene contains 1 to 100, 1 to 80, 1 to 50, 1 to 30, 1 to 20, 1 to 10, 1 to 6, or 1 to 4 carbon atoms. The radical centers of the alkylene can be on the same carbon atom (i.e., an alkylidene) or on different carbon atoms.

As used herein, the term "aralkyl" refers to a monovalent radical of the compound Ar—R where Ar is an aromatic carbocyclic group and R is an alkyl group.

As used herein, the term "aralkylene" refers to a divalent radical of formula —R—Ar— where Ar is an arylene group and R is an alkylene group.

As used herein, the term "aryl" refers to a monovalent aromatic carbocyclic radical. The aryl can have one aromatic ring or can include up to 5 carbocyclic ring structures that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

As used herein, the term "arylene" refers to a divalent radical of a carbocyclic aromatic compound having one to five rings that are connected, fused, or combinations thereof. In some embodiments, the arylene group has up to 5 rings, up to 4 rings, up to 3 rings, up to 2 rings, or one aromatic ring. For example, the arylene group can be phenylene.

The above aryl and arylenes can optionally contain substituents such as lower alkyl, halo, and alkoxy.

As used herein, the term "carbonyl" refers to a divalent group of formula —(CO)—.

As used herein, the term "carbonylimino" refers to a divalent group of formula —(CO)NR$^a$— where R$^a$ is hydrogen, alkyl, or aryl.

As used herein, the term "carbonyloxy" refers to a divalent group of formula —(CO)O—.

As used herein, the term "chloroalkyl" refers to an alkyl having at least one hydrogen atom replaced with a chlorine atom.

As used herein, the term "ethylenically unsaturated" refers to a monovalent group having a carbon-carbon double bond of formula —CY=CH$_2$ where Y is hydrogen, alkyl, or aryl.

As used herein, the term "fluoroalkyl" refers to an alkyl having at least one hydrogen atom replaced with a fluorine atom. Some fluoroalkyl groups are perfluoroalkyl groups.

As used herein, the term "heteroalkylene" refers to a divalent alkylene having one or more carbon atoms replaced with a sulfur, oxygen, or NR$^d$ where R$^d$ is hydrogen or alkyl. The heteroalkylene can be linear, branched, cyclic, or combinations thereof and can include up to 400 carbon atoms and up to 30 heteroatoms. In some embodiments, the heteroalkylene includes up to 300 carbon atoms, up to 200 carbon atoms, up to 100 carbon atoms, up to 50 carbon atoms, up to 30 carbon atoms, up to 20 carbon atoms, or up to 10 carbon atoms.

As used herein, the term "heteroarylene" refers to a divalent arylene having one or more carbon atoms replaced with a sulfur, oxygen, or NR$^f$ where R$^f$ is hydrogen or alkyl.

As used herein, the term "oxy" refers to a divalent group of formula —O—.

As used herein, the term "perfluoroalkyl" refers to an alkyl group in which all of the hydrogen atoms are replaced with fluorine atoms.

As used herein, the term "thio" refers to a group of formula —S—.

As used herein, the term "room temperature" refers to a temperature of about 20° C. to about 25° C. or about 22° C. to about 25° C.

As used herein, a curve connecting two groups in a formula indicates that the two groups together form part of a cyclic structure.

For any of the compounds presented herein, each one of the following variables (e.g., $R^1$, $R^2$, $Y^1$, $Y^2$, Z, A, and so on) in any of its embodiments can be combined with any one or more of the other variables in any of their embodiments as would be understood by one of skill in the art. Each of the resulting combinations of variables is an embodiment of the present invention.

When a group (or substituent or variable) is present more than once in a compound or polymer described herein, each group (or substituent or variable) is independently selected, whether explicitly stated or not. For example, for the soluble polymers of the present invention each pendant group is independently selected. Furthermore, when each pendant group contains one or more L groups, as defined below, then each L group is also independently selected.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present invention provides soluble polymers that have two or more pendant groups independently selected from those having the following formulas:

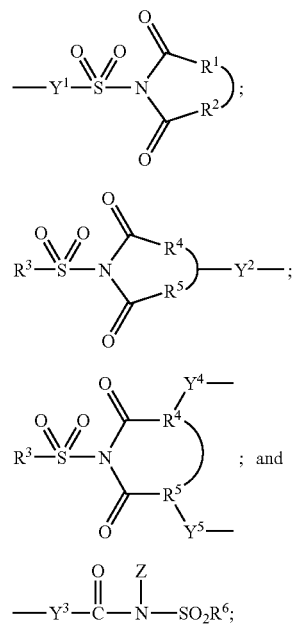

wherein $R^1, R^2, R^3, R^4, R^5, R^6, Y^1, Y^2, Y^3, Y^4, Y^5$, and Z are defined herein below.

As used herein, a soluble polymer is one that is soluble at room temperature in an amount of at least 0.01 weight percent (wt-%) in water or at least one organic solvent. Preferably, the soluble polymers of the present invention are soluble at room temperature in an amount of at least 0.1 wt-% in water or at least one organic solvent. Preferably, the soluble polymers of the present invention are soluble at room temperature in an amount of at least 1.0 wt-% in water or at least one organic solvent. Exemplary organic solvents in which the polymers can be soluble include acetonitrile, tetrahydrofuran, ethyl acetate, benzene, acetone, methyl ethyl ketone, isopropanol, chlorinated and fluorinated hydrocarbons, fluorinated ethers, or combinations thereof.

Such soluble polymers can be made by polymerization of monomers bearing the amine-reactive functionality or by addition of reactive derivatives bearing the amine-reactive functionality with appropriately substituted oligomers and polymers.

For the polymerization approach, addition polymerization of ethylenically unsaturated monomers is preferred. These include, for example, (meth)acrylates, (meth)acrylamides, vinyl ethers, styrenes, olefins (e.g., strained internal olefins), allyl ethers, etc. At least one monomer includes a functional group that forms the pendant groups defined above.

Preferred starting monomers are those of the following formula:

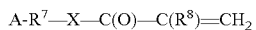

wherein:

X is $-N(R^9)-$ or $-O-$;

$R^7$ is a divalent group selected from the group consisting of alkylene, heteroalkylene, arylene, heteroarylene, and combinations thereof (e.g., groups including both alkylene and arylene groups), wherein $R^7$ optionally includes one or more carbonyls;

$R^8$ is hydrogen or methyl; and $R^9$ is hydrogen or a $C_{1-6}$ alkyl group; and further wherein A is selected from the group consisting of functional groups having the following formulas:

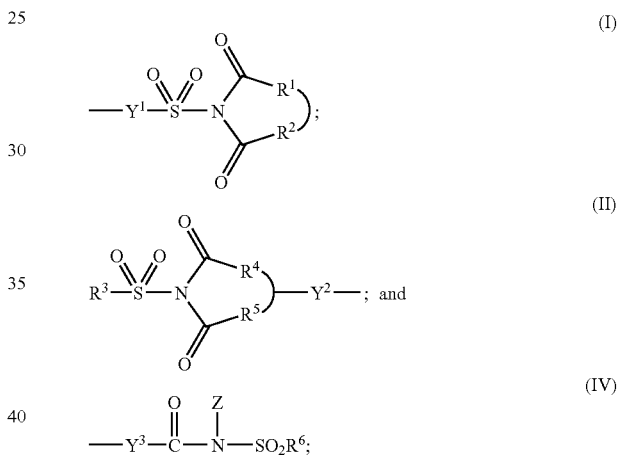

wherein, $R^1, R^2, R^3, R^4, R^5, R^6, Y^1, Y^2, Y^3$, and Z are defined herein below.

Comonomers can be selected for several reasons, including dilution of the above identified monomers of the formula $A-R^7-X-C(O)-C(R^8)=CH_2$, thermal and mechanical stability, adhesion, etc. Examples of comonomers include lower alkyl acrylates and methacrylates, polyethylene glycol monoalkyl ether acrylates and methacrylates, vinyl ethers, styrenes, (meth)acrylamides, allyl ethers, strained internal olefins, and the like.

The second approach to preparing soluble polymers of the present invention involves addition of a functionally reactive amine capture group to a pre-existing polymer, the latter made by addition or condensation polymerization. For example, $ClC(O)C_8H_{16}C(O)$-Saccharin can be reacted with poly(methylmethacrylate-co-hydroxyethylmethacrylate) and polyvinyl alcohol.

Herein, in Formula I, $R^1$ and $R^2$ together with a dicarboximide group to which they are attached form a four to eight membered heterocyclic or heterobicyclic group that can be fused to an optional aromatic group, optional saturated or unsaturated cyclic group, or optional saturated or unsaturated bicyclic group.

Herein, in Formulas II and III, $R^3$ is an alkyl, aryl, aralkyl, or $—NR^aR^b$ wherein $R^a$ and $R^b$ are each an alkyl group or taken together with the nitrogen atom to which they are attached form a four to eight membered heterocyclic group.

In certain embodiments of Formulas II and III, $R^3$ is an alkyl, aryl, or aralkyl. Suitable alkyl groups typically contain no greater than 30 carbon atoms, no greater than 20 carbon atoms, no greater than 10 carbon atoms, no greater than 6 carbon atoms, or no greater than 4 carbon atoms. In some compounds, the alkyl group is methyl, ethyl, or propyl. Suitable aryl groups typically contain 6 to 18 carbon atoms, 6 to 12 carbon atoms, or 6 carbon atoms. In some compounds, the aryl group is phenyl. An example of an aryl group is 4-methylphenyl. Suitable aralkyl groups typically contain an aryl group having 6 to 30 carbon atoms and an alkyl group having no greater than 30 carbon atoms.

In other embodiments of Formulas II and III, $R^3$ is a group $—NR^aR^b$ where $R^a$ and $R^b$ are alkyl groups having no greater than 10 carbon atoms, no greater than 6 carbon atoms, or no greater than 4 carbon atoms. Alternatively, the $R^a$ and $R^b$ groups can combine together with the nitrogen atom to which they are attached to form a 4 to 8 membered ring structure. For example, $R^a$ and $R^b$ can combine to form a five or six membered heterocyclic group having a nitrogen heteroatom.

Herein, in Formulas II and III, $R^4$ and $R^5$ together with a dicarboximide group to which they are attached form a four to eight membered heterocyclic or heterobicyclic group that can be fused to an optional aromatic group, optional saturated or unsaturated cyclic group, or optional saturated or unsaturated bicyclic group.

Herein, in Formula IV, $R^6$ is an alkyl, fluoroalkyl, chloroalkyl, aryl, $—NR^cR^d$ wherein $R^c$ and $R^d$ are each an alkyl group or taken together with the nitrogen atom to which they are attached form a four to eight membered cyclic group, or $R^6$ taken together with $R^e$ and the groups to which they are attached form the four to eight membered heterocyclic or heterobicyclic group that can be fused to the optional aromatic group, optional saturated or unsaturated cyclic group, or optional saturated or unsaturated bicyclic group.

In some embodiments of Formula IV, $R^6$ can be a $C_{1-30}$ alkyl, a $C_{1-10}$ alkyl, or a $C_{1-6}$ alkyl. In other embodiments of Formula IV, $R^6$ can be a $C_{1-30}$ fluoroalkyl, a $C_{1-10}$ fluoroalkyl, or a $C_{1-4}$ perfluoroalkyl group. In still other embodiments of Formula IV, $R^6$ can be a $C_{6-12}$ aryl. For example $R^6$ can be a phenyl group.

Herein, in Formula IV, Z is an alkyl, aryl, or $—(CO)R^e$. In some embodiments of Formula IV, Z can be alkyl or aryl. For example, Z can be a $C_{1-6}$ alkyl. In other examples, Z can be a $C_{6-12}$ aryl. In other embodiments of Formula IV, Z can be a $—(CO)R^e$ group, wherein $R^e$ together with $R^6$ and groups to which they are attached form a four to eight-membered heterocyclic or heterobicyclic group having a nitrogen heteroatom and a sulfur heteroatom, wherein the heterocyclic or heterobicyclic group can be fused to an optional aromatic group, optional saturated or unsaturated cyclic group, or optional saturated or unsaturated bicyclic group.

Herein, $Y^1, Y^2,$ and $Y^3$ are each independently a single bond or a divalent group selected from the group consisting of an alkylene, heteroalkylene, arylene, heteroarylene, carbonyl, carbonyloxy, carbonylimino, oxy, thio, $—NR^f—$ where $R^f$ is hydrogen or alkyl, and combinations thereof. In certain embodiments, $Y^1, Y^2,$ and $Y^3$ are each independently selected from the group consisting of groups having the following formulas $—Y^{1a}—Ar^1—$ and $—Ar^1—Y^{1a}—$, wherein: $Ar^1$ is an arylene; and $Y^{1a}$ is selected from the group consisting of a single bond, alkylene, heteroalkylene, carbonyl, carbonyloxy, carbonylimino, oxy, thio, $—NR^f—$ where $R^f$ is hydrogen or alkyl, and combinations thereof.

In certain embodiments, $Y^1, Y^2,$ and $Y^3$ are each independently selected from the group consisting of groups having the following formulas: $—Y^{1a}—Ar^1—$ and $—Ar^1—Y^{1a}—$. In such formulas, $Ar^1$ is an arylene (preferably, a phenylene), and $Y^{1a}$ is selected from the group consisting of a single bond, alkylene, heteroalkylene, carbonyl, carbonyloxy, carbonylimino, oxy, thio, $—NR^f—$ where $R^f$ is hydrogen or alkyl, and combinations thereof.

In certain embodiments, $Y^1, Y^2,$ and $Y^3$ each independently includes a first alkylene group linked to an arylene group with a group selected from the group consisting of a carbonyl, carbonyloxy, carbonylimino, oxy, thio, $—NR^f—$ where $R^f$ is hydrogen or alkyl, and combinations thereof. In certain of these embodiments, the first alkylene group is further linked to a second alkylene or a first heteroalkylene group with a group selected from the group consisting of a carbonyl, carbonyloxy, carbonylimino, oxy, thio, $—NR^f—$ where $R^f$ is hydrogen or alkyl, and combinations thereof. In certain of these embodiments, additional alkylene or heteroalkylene groups can be linked to the second alkylene or to the first heteroalkylene group with a group selected from the group consisting of a carbonyl, carbonyloxy, carbonylimino, oxy, thio, $—NR^f—$ where $R^f$ is hydrogen or alkyl, and combinations thereof.

In certain embodiments, $Y^1, Y^2,$ and $Y^3$ each independently includes a first heteroalkylene group linked to an arylene with a group selected from the group consisting of a carbonyl, carbonyloxy, carbonylimino, oxy, thio, $—NR^f—$ where $R^f$ is hydrogen or alkyl, and combinations thereof. In certain of these embodiments, the first heteroalkylene group is further linked to a second heteroalkylene or to a first alkylene group with a group selected from the group consisting of a carbonyl, carbonyloxy, carbonylimino, oxy, thio, $—NR^f—$ where $R^f$ is hydrogen or alkyl, and combinations thereof. In certain of these embodiments, additional alkylene or heteroalkylene groups linked to the second heteroalkylene or to the first alkylene group with groups selected from the group consisting of carbonyl, carbonyloxy, carbonylimino group, oxy, thio, $—NR^f—$ where $R^f$ is hydrogen or alkyl, and combinations thereof.

In certain embodiments, $Y^1, Y^2,$ and $Y^3$ each independently includes a first alkylene group connected to a second alkylene group or to a first heteroalkylene group with a group selected from the group consisting of a carbonyl, carbonylimino, carbonyloxy, oxy, thio, $—NR^f—$ where $R^f$ is hydrogen or alkyl, and combinations thereof. In certain of these embodiments, additional alkylene or heteroalkylene groups connected to the second alkylene group or the first heteroalkylene group with a group selected from the group consisting of a carbonyl, carbonylimino, carbonyloxy, oxy, thio, $—NR^f—$ where $R^f$ is hydrogen or alkyl, and combinations thereof.

In certain embodiments, $Y^1, Y^2,$ and $Y^3$ are each independently a heteroalkylene group. In certain embodiments, $Y^1, Y^2,$ and $Y^3$ each independently includes a first heteroalkylene group connected to a second heteroalkylene group or to a first alkylene group with a group selected from the group consisting of a carbonyl, carbonylimino, carbonyloxy, oxy, thio, $—NR^f—$ where $R^f$ is hydrogen or alkyl, and combinations thereof. In certain of these embodiments, additional alkylene or heteroalkylene groups connected to the second heteroalkylene group or the first alkylene group.

In certain embodiments, $Y^1, Y^2,$ and $Y^3$ are each independently a heteroalkylene having 1-30 carbon atoms and up to 30 heteroatoms selected from the group consisting of N, O, S, and combinations thereof, wherein the heteroalkylene group is linear, branched, cyclic, or combinations thereof.

In certain embodiments, $Y^1$, $Y^2$, and $Y^3$ are each independently an alkylene having 1-30 carbon atoms, wherein the alkylene group is linear, branched, cyclic, or combinations thereof. In certain of these embodiments, the alkylene group can be linear or branched with up to 20 carbon atoms. In certain embodiments, the alkylene is of the formula $(CH_2)_n$, where n is an integer of 1 to 20.

In certain embodiments, $Y^1$, $Y^2$, and $Y^3$ each independently includes an arylene group (preferably, including up to 18 carbon atoms, up to 12 carbon atoms, or up to 6 carbon atoms), in addition to one or more alkylene groups and one or more heteroalkylene groups.

Herein, $Y^4$ and $Y^5$ are each a bond.

Exemplary Soluble Polymers and Compounds

Exemplary Formula I structures include, but are not limited to, the following:

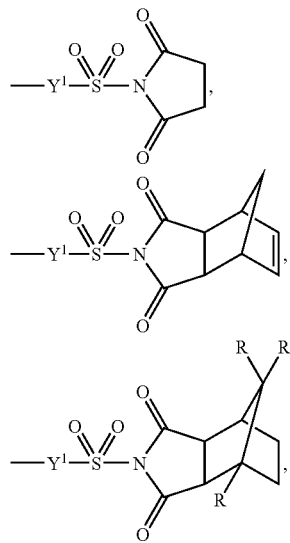

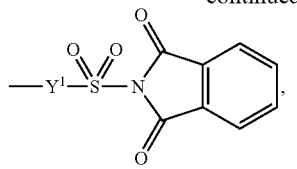

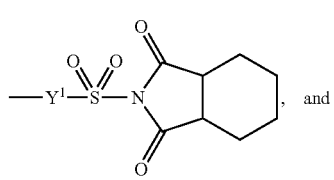

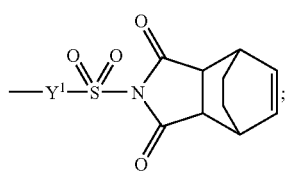

wherein R is an alkyl and $Y^1$ is the same as previously defined for Formula I. In certain of these exemplary embodiments, $Y^1$ can be $—Y^{1a}—Ar^1—$ or $—Ar^1—Y^{1a}—$, wherein $Ar^1$ is an arylene (preferably, a phenylene), and $Y^{1a}$ is selected from the group consisting of a single bond, alkylene, heteroalkylene, carbonyl, carbonyloxy, carbonylimino, oxy, thio, $—NR^f—$ where $R^f$ is hydrogen or alkyl, and combinations thereof. The functional groups of Formula I can be unsubstituted or substituted with a halo, alkyl, alkoxy, or combinations thereof.

Exemplary Formula I structures also include, but are not limited to, the following:

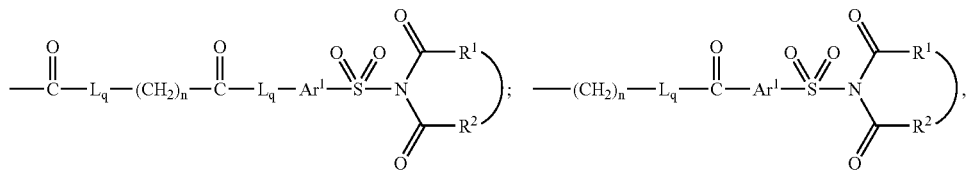

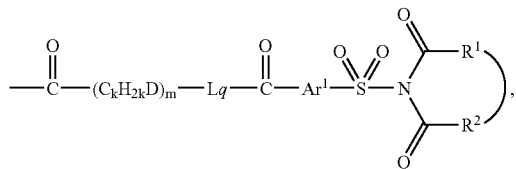

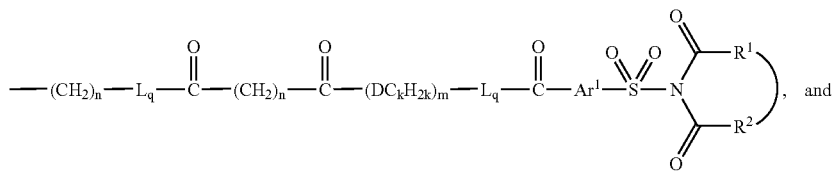

-continued

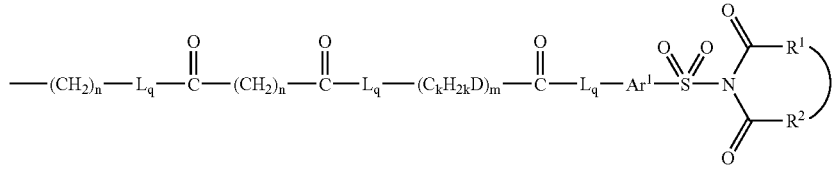

wherein: $R^1$ and $R^2$ are the same as previously defined for Formula I; each n is independently an integer of 1 to 100; m is an integer of 1 to 200; k is an integer of 2 to 4; D is oxygen, sulfur, or NH; $Ar^1$ is an arylene group; each L is independently oxygen or $NR^f$ where $R^f$ is hydrogen or alkyl; and q is in integer of 0 or 1. In such embodiments, preferably, n is no greater than 80, no greater than 60, no greater than 40, no greater than 20, or no greater than 10; preferably, m is no greater than 150, no greater than 100, no greater than 80, no greater than 60, no greater than 40, no greater than 20, or no greater than 10; preferably, k is equal to 2; preferably, D is oxygen; and preferably, $Ar^1$ is phenylene.

Exemplary Formula II structures include, but are not limited to, the following:

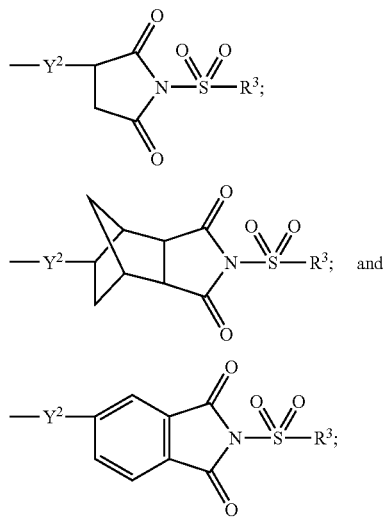

wherein $R^3$ and $Y^2$ are the same as previously defined for Formula II. The functional groups of Formula II can be unsubstituted or substituted with a halo, alkyl, alkoxy, or combinations thereof.

Exemplary Formula II structures also include, but are not limited to, the following:

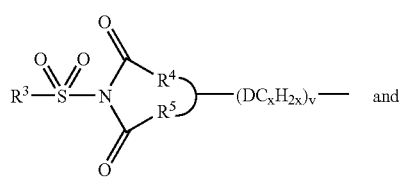

-continued

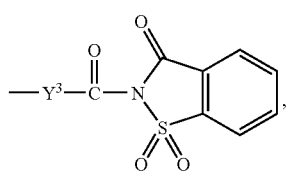

wherein: $R^3$, $R^4$, and $R^5$ are the same as previously defined for Formula II; v is an integer of 1 to 200; x is an integer of 1 to 4; and D is oxygen, sulfur, or NH. In such embodiments, preferably, v is no greater than 150, no greater than 100, no greater than 80, no greater than 60, no greater than 40, no greater than 20, no greater than 10, no greater than 5, no greater than 4, no greater than 3, no greater than 2, or equal to 1, and more preferably, v is 1 or 2; preferably, x is no greater than 3, no greater than 2, or equal to 1, and more preferably, x is 1 or 2; and preferably, D is oxygen or sulfur.

Exemplary Formula III structures include the following formulas:

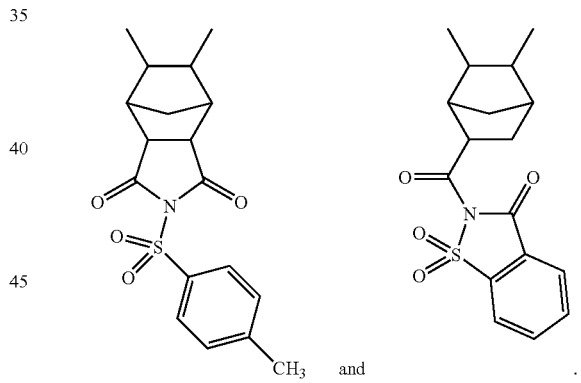

An exemplary Formula IV structure includes a heterocyclic group fused to an aromatic group as shown in the following formula:

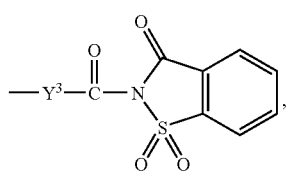

wherein $Y^3$ is the same as previously defined for Formula IV.

In certain embodiments, the soluble polymer of the present invention includes two or more pendant groups independently selected from the following formulas:

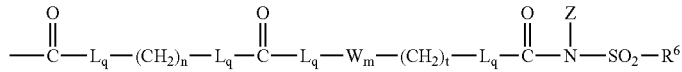

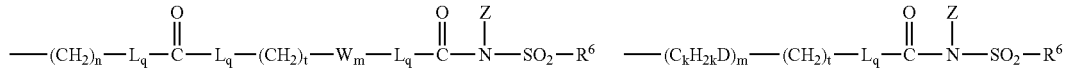

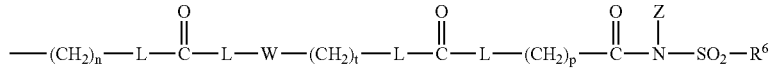

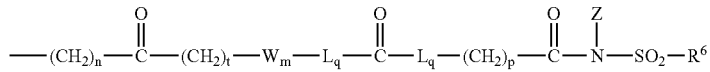

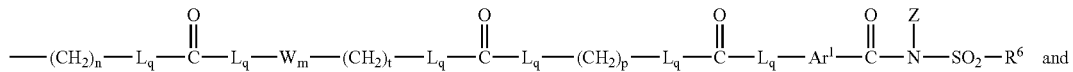

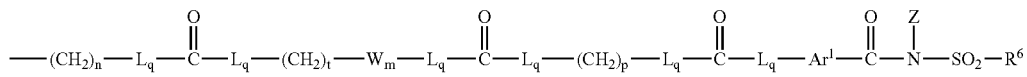

wherein: $R^6$ is the same as previously defined for Formula IV; W is $C_kH_{2k}D$ or $DC_kH_{2k}$; D is oxygen, sulfur, or NH (preferably, oxygen); n is an integer of 1 to 100 (preferably no greater than 80, no greater than 60, no greater than 40, no greater than 20, no greater than 10); m is an integer of 1 to 200 (preferably no greater than 150, no greater than 100, no greater than 80, no greater than 60, no greater than 40, no greater than 20, no greater than 10); p is an integer of 1 to 10 (preferably no greater than 8, no greater than 6, no greater than 4, or no greater than 2); q is an integer of 0 or 1; t is an integer of 0 to 12 (preferably no greater than 10, no greater than 8, no greater than 6, no greater than 4, no greater than 2, or equal to 0); k is an integer of 2 to 4 (preferably no greater than 3, no greater than 2, or equal to 2); and each L is independently oxygen or $NR^f$ where $R^f$ is hydrogen or alkyl; with the proviso that at least one L is present in each $-L_q-C(O)-L_q$-moiety and there are no heteroatom-heteroatom bonds.

In certain embodiments, the soluble polymer of the present invention includes two or more pendant groups independently selected from the following formulas:

wherein: $R^6$ is the same as previously defined herein for Formula IV; n is an integer of 1 to 100 (preferably no greater than 80, no greater than 60, no greater than 40, no greater than 20, no greater than 10); m is an integer of 1 to 200 (preferably no greater than 150, no greater than 100, no greater than 80, no greater than 60, no greater than 40, no greater than 20, no greater than 10); p is an integer of 1 to 10 (preferably no greater than 8, no greater than 6, no greater than 4, or no greater than 2); t is an integer of 0 to 12 (preferably no greater than 10, no greater than 8, no greater than 6, no greater than 4, no greater than 2, or equal to 0); k is an integer of 2 to 4 (preferably no greater than 3, no greater than 2, or equal to 2); each L is independently oxygen or $NR^f$ where $R^f$ is hydrogen or alkyl; and q is 0 or 1.

Preferred monomeric compounds for the preparation of soluble polymers of the present invention are of the following formulas:

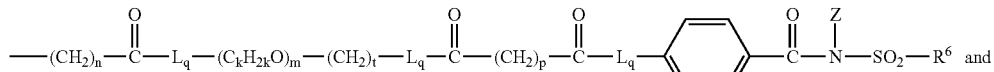

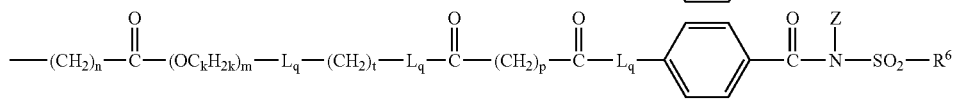

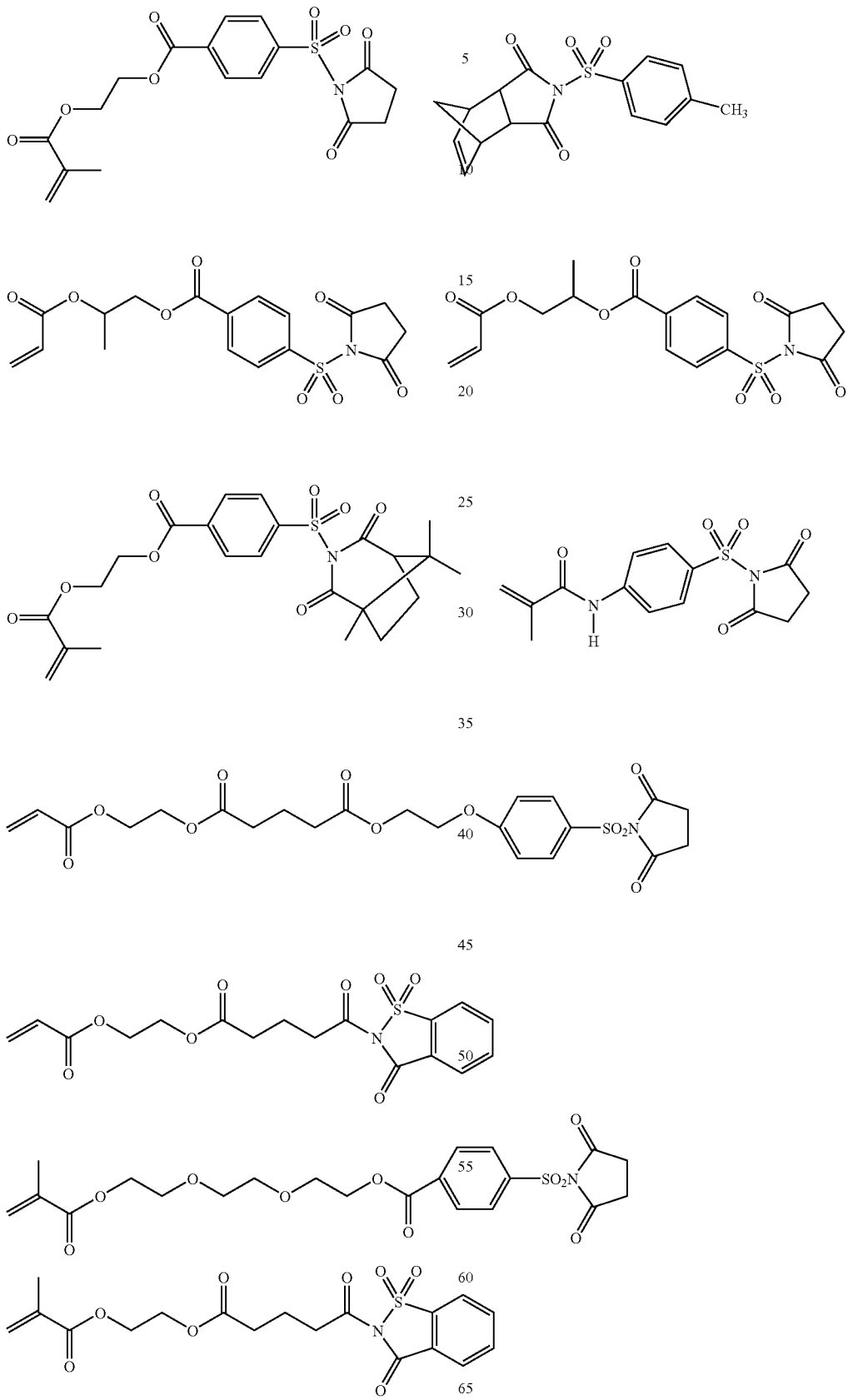

Preferred soluble polymers of the present invention are derived from two to four different (meth)acrylate monomers, wherein at least one monomer includes an acylsulfonamide group. Preferably, at least one monomer is of the formula

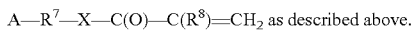

Even more preferred soluble polymers are of the following formula:

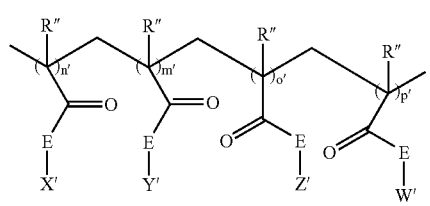

wherein:
each R" is independently H or CH$_3$;
each E is —O— or —NR$^f$—, where R$^f$ is hydrogen or alkyl;
m', n', o', p' represent the number of times each moiety is present in the polymer;
X', Y', Z', and W' are independently selected from the group consisting of alkyl (e.g., methyl or cycloalkyls such as isobornyl), aryl, hydroxy ester, alkoxyalkyl, alkoxyaryl, ether, fluoroalkyl, trialkoxysilylalkyl, and N-containing groups (e.g., dimethylaminoethyl group, saccharin group); and
at least one of X', Y', Z', or W' includes an acylsulfonamide group, and preferably the following N-containing group (wherein the bond to the carbonyl represents the attachment site of the group):

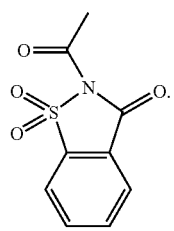

This representation of a preferred polymer includes at least two distinct moieties (i.e., formed from two different monomers). That is, the above formula represents a copolymer, terpolymer, or tetrapolymer. Preferably, it is a terpolymer. Such polymers are preferably random polymers, although they can be block or segmented polymers. These repeating moieties are present in sufficient numbers to form a polymer having a molecular weight of at least 1000, and preferably to over 1 million.

Preferably, at least one of X', Y', Z', or W' is the following group:

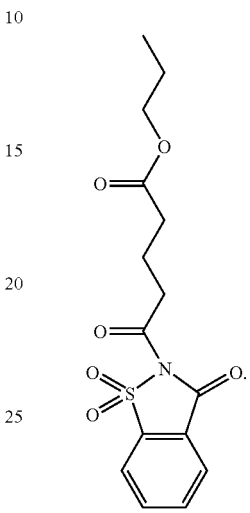

Such polymers can be constructed from at least two (preferably, three or four, and more preferably, three) distinct (meth)acrylate monomers combining X', Y', Z', and W' functionality. Suitable (meth)acrylates, include, for example, alkyl(meth)acrylates, aryl (meth)acrylates, hydroxy alkyl (meth)acrylates, N-containing (meth)acrylates, ether-containing (meth)acrylates, and fluoroalkyl(meth)acrylates.

Examples of alkyl(meth)acrylates include methyl-, ethyl-, butyl-, isobutyl-, n-hexyl-, 2-ethylhexyl-, isodecyl-, lauryl-, stearyl-, behenyl-, and isotridecyl-(meth)acrylate. Examples of cyclic (e.g., cycloalkyl and aryl)(meth)acrylates include benzyl-, isobornyl-, cyclohexyl-, and 3,3,5-trimethylcyclohexyl-(meth)acrylate. Examples of hydroxy alkyl (meth)acrylates include 2-hydroxyethyl and hydroxypropyl methacrylate. Examples of N-containing methacrylates include N,N-dimethylaminoethyl-, N,N-dimethylaminopropyl-, 2-trimethylammonium ethyl methacrylate chloride, and saccharins. Examples of ether-containing methacrylates include ethyl triglycol-, tetrahydrofurfuryl-, polyethyleneglycol, monomethylethyl-, and butyl diglycol-methacrylate. An example of a fluoroalkyl methacrylate includes N-methyl perfluorobutanesulfonamidoethyl methacrylate.

More preferred soluble polymers of the present invention are of the following formulas (wherein the variables m', n', o', p' represent repeat units in these random polymers of molecular weights of at least 1000, and preferably to over 1 million):

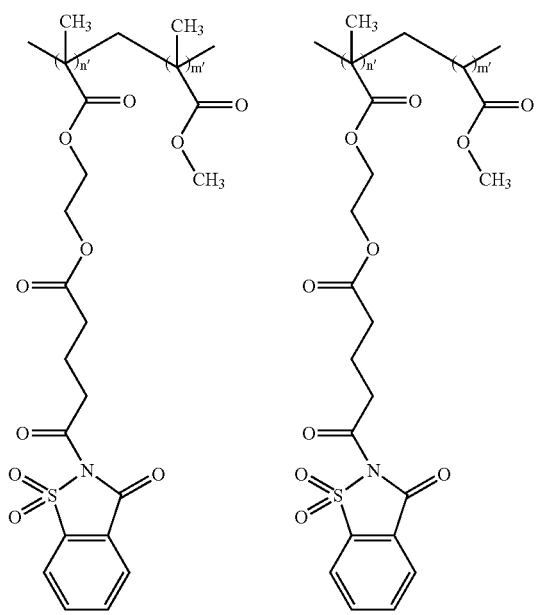
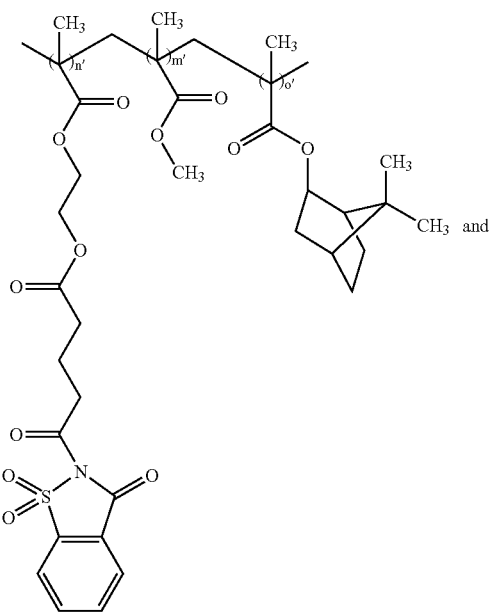
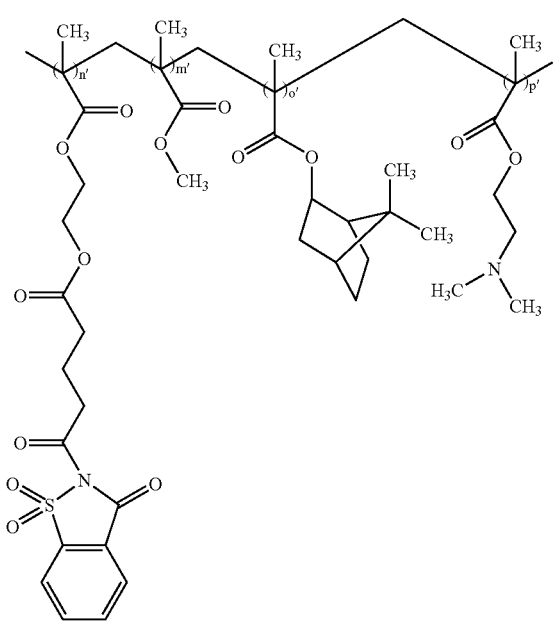
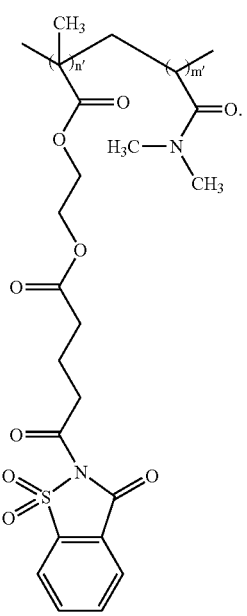
Particularly preferred soluble polymers of the present invention are of the following formula:

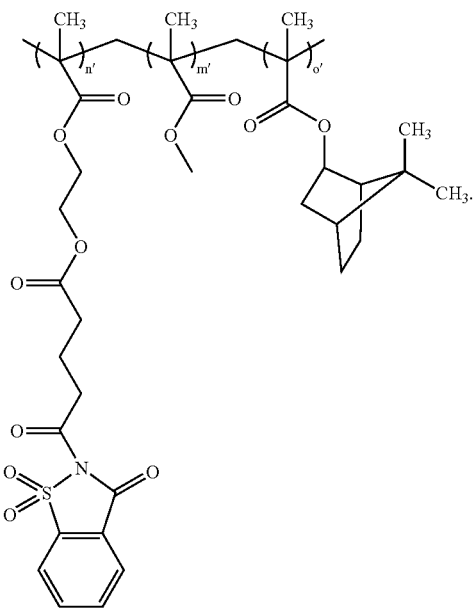

Methods of Preparation

Polymerizable ethylenically unsaturated monomers bearing the amine-reactive group, suitable for preparing soluble polymers of the present invention, can be made by covalently combining functionally substituted amine-capture groups (A/R/G) (which represent the pendant groups of formulas I-IV described herein) with ethylenically unsaturated monomers bearing complementary functionality. For example, suitable functionalized monomers can be prepared as follows:

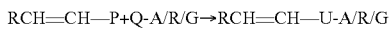

wherein "P" and "Q" are complementary and react covalently together, forming the "U" group which connects the A/R/G to the polymer when these monomers are (co)polymerized.

For instance, hydroxyethyl methacrylate can be reacted with glutaric anhydride to give glutaric acid mono(methacryloxyethyl)ester, which, as its acyl chloride, can be coupled with saccharin Na salt or N-4-hydroxyethoxybenzenesulfonylsuccinimide. This synthetic strategy allows evaluation of a wide variety of groups to optimize specific systems for attachment of the amine-reactive groups and subsequent capture of the amine. Readily available components such as polyethylene glycols and alkanediols allow variation of the length, hydrophilicity, and rotational freedom of the tether, all of which are expected to alter the responsiveness of the attached amine-reactive group. Such ethylenically unsaturated monomers are (co)polymerizable under standard free radical polymerization conditions, preferably in solution polymerizations. In these, a solution of the desired functionalized monomer, optionally one or more comonomers, and a thermal initiator is purged of oxygen and heated and agitated (typically for about 20 hours). Comonomers may be selected for their effects on solubility, glass transition, melting point, hydro- and oleo-phobicity/-philicity, adhesion to the substrate, and the like. Examples of comonomers include lower alkyl acrylates and methacrylates, polyethylene glycol monoalkyl ether acrylates and methacrylates, vinyl ethers, styrenes, acrylamides, methacrylamides, allyl ethers, strained internal olefins, and the like.

Alternatively, soluble polymers of the present invention can be made from functionally substituted preformed polymers. That is, a soluble polymer of the present invention can be made by covalently combining functionally substituted amine-capture groups with soluble polymers bearing complementary functionality (one with a P group and one with a complementary Q group as discussed above), or by generating the amine-capture group from soluble polymers bearing acylating or sulfonylating groups. For example, a copolymer of hydroxyethyl methacrylate and methyl methacrylate can be treated with the acid chloride derived from first reacting excess glutaryl chloride with saccharin Na salt or N-4-hydroxyethoxybenzenesulfonylsuccinimide and then removing the excess glutaryl chloride. An alternative strategy is exemplified by reacting saccharin Na salt with a copolymer of beta-acryloxyacryloyl chloride and an alkyl acrylate or by reacting N-4-hydroxyethoxybenzene-sulfonylsuccinimide with poly(5-norbornene-2-carbonylchloride).

Uses

The soluble polymers of the invention can be used, for example, to immobilize amine-containing material. In some embodiments, the amine-containing material is an amine-containing analyte (of a wide range of molecular weights including large biomolecules). In certain embodiments, the amine-containing materials are biomolecules such as, for example, amino acids, peptides, DNA, RNA, protein, enzymes, organelles, immunoglobins, or fragments thereof. Immobilized biological amine-containing materials can be useful in the medical diagnosis of a disease or of a genetic defect. The immobilized amine-containing materials can also be used for biological separations or for detection of the presence of various biomolecules. Additionally, the immobilized amine-containing materials can be used in bioreactors or as biocatalysts to prepare other materials. The substrate-attached tethering groups can be used to detect amine-containing analytes.

Biological amine-containing materials often can remain active after attachment to the soluble polymer. For example, an immobilized antibody can bind with antigen or an immobilized antigen can bind to an antibody. An amine-containing material can bind to a bacterium. In a more specific example, the immobilized amine-containing material can bind to a *Staphylococcus aureus* bacterium (e.g., the immobilized amine-containing material can be a biomolecule that has a portion that can specifically bind to the bacterium).

The soluble polymers of the present invention can be coated on a wide variety of substrates, including, metals, glasses, polymers, ceramics, etc. The articles prepared by coating the soluble polymers of the invention to a substrate typically are expected to have improved hydrolytic stability compared to polymers having pendant carbonyl-N-hydroxysuccinimide groups, based on model compound reactivities. Typically, chemical attachment is not required, but if there are reactive sites, such as on glass, better bonding can be accomplished with a silane in the polymer.

If the soluble polymers are made from monomers as described above, the various monomers can provide additional functionality for thermally activated condensation reactions, substrate attachment, and to create desirable physical and/or chemical properties such as solubility, wettability, control of Tg, adhesive properties, etc.

The soluble polymers of the invention are also useful as crosslinkers to cause precipitation or gellation of amine-containing polymers. Water-soluble polymers of the invention can be reacted with water-soluble polyamines to form adducts which can be used to bond or seal tissue in vivo, as described for naturally occurring polyamines in U.S. Pat. No. 5,583,114 and for synthetic polyamines in U.S. Pat. No. 5,874,500.

EXAMPLES

Objects and advantages of this invention are further illustrated by the following examples, but the particular materials and amounts thereof recited in these examples, as well as other conditions and details, should not be construed to unduly limit this invention.

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| VAZO 67 | 2,2'azobis(2-methlbutyronitrile), commercially available from DuPont Chemical Company, Wilmington, DE |
| EtOAc | ethyl acetate |
| ACN | Acetonitrile |
| DMF | Dimethylformamide |
| NMP | N-methylpyrrolidinone |
| THF | Tetrahydrofuran |
| Na saccharin | Sodium salt of saccharin, dehydrated |

Preparative Example 1

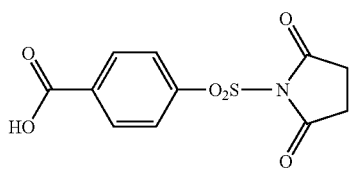

In a glass reaction vessel, a mixture of DMF (154 milliliters), 4-carboxybenzenesulfonamide (30.0 grams), succinic anhydride (16.41 grams), and triethylamine (33.19 grams) was stirred and heated to 50° C. under a nitrogen atmosphere for four hours. The mixture was allowed to cool to room temperature, acetic anhydride (18.27 milliliters) was added and the mixture was stirred at room temperature for an additional three hours. The mixture was poured into 400 milliliters of stirred 1N aqueous HCl. This mixture was filtered, washed with deionized water and dried in a vacuum oven to afford the desired product. Yield: 36.94 grams.

Preparative Example 2

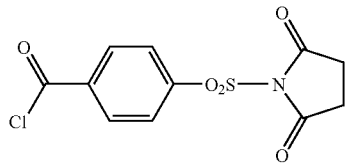

In a glass reaction vessel containing a stirred mixture of the carboxy-containing product of Preparative Example 1 (20.0 grams) and dry acetonitrile (85 grams) was added thionyl chloride (10.0 grams) and DMF (1 drop). The resulting mixture was stirred and heated under reflux for one hour, cooled to room temperature and further cooled in an ice bath, which resulted in the formation of a solid precipitate. The solid was collected by filtration, washed sequentially with cold acetonitrile and cold toluene, and dried overnight in a vacuum oven at 50° C. to give the desired product. Yield: 17.7 grams.

Preparative Example 3

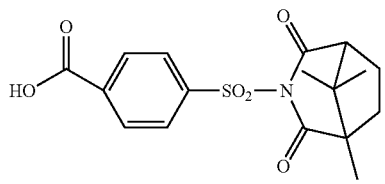

A glass reaction vessel fitted with a reflux condenser and magnetic stir bar was charged with trimethyl orthoformate (34.28 grams), 4-carboxybenzenesulfonamide (50.00 grams), toluenesulfonic acid (2.5 grams) and methanol (197 mL). The mixture was heated to 70° C. for 16 hours. The cooled mixture was concentrated on a rotary evaporater. Diethyl ether (200 mL) was added to the concentrate and stirred. The resulting solid was filtered to afford 51.3 grams of the desired 4-methoxycarbonyl benzenesulfonamide. In a glass reaction vessel fitted with a reflux condenser, a thermometer, a pressure-equalizing addition funnel, and a nitrogen inlet was placed a 60 weight percent dispersion of NaH in mineral oil (16.22 grams). The dispersion was washed three times with heptane by stirring the mixture for several minutes, allowing the mixture to stand, and using a pipette to decant the supernatant heptane. NMP (50 grams) was added to the flask and the mixture was stirred. To this stirred mixture was added a solution of camphoric anhydride (14 grams), 4-methoxycarbonyl benzenesulfonamide (15 grams), and NMP (61 grams) slowly via the addition funnel. The resulting mixture was stirred at room temperature for approximately 1 hour, poured into a beaker of deionized water that was vigorously stirred. The basic mixture was acidified with 1.0N HCl and subsequently extracted with EtOAc. The volatile components were removed using a rotary evaporator to afford a solid intermediate. This intermediate was combined with THF (111 grams), acetic anhydride (8.54 grams), and triethylamine (23.3 grams) and stirred for 1 hour at 60° C. The mixture was poured into aqueous 1N HCl and the resultant solid isolated by filtration. The solid was combined with methanol and this mixture was heated to boiling, cooled to room temperature, filtered, and washed sequentially with methanol and diethyl ether. The solid was dried overnight in a vacuum oven at room temperature and 67 Pa (0.5 mm Hg) to give the desired product.

Preparative Example 4

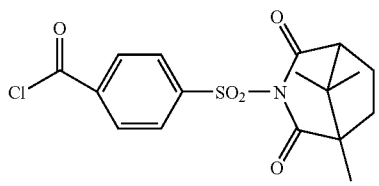

In a glass reaction vessel fitted with a reflux condenser, a thermometer, and a nitrogen inlet was placed the carboxylic acid product of Preparative Example 3 and ACN (20 grams). The flask was placed in an ice bath and a 20 weight percent solution of phosgene in toluene (15.57 grams) that was obtained from Fluka Holding AG, Buchs, Switzerland was added slowly via syringe. The mixture was allowed to warm to room temperature and heated at reflux. Periodically, the atmosphere above the reaction mixture was tested for the presence of phosgene using phosgene indicator paper. When no phosgene could be detected in this way, the flask was fitted with a distillation head and a small amount of the volatile materials were distilled away. The mixture was filtered and the solid was dried under a stream of nitrogen gas to give the desired product.

Preparative Example 5

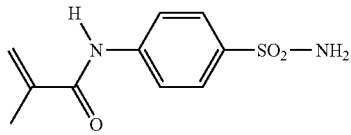

In a glass reaction vessel, to a solution of sulfanilamide (10.75 grams) in THF (85.4 milliliters) was added pyridine (5.93 grams) and the flask was chilled in an ice bath. Methacrylic anhydride (10.59 grams) was added and the mixture was stirred overnight while warming to room temperature. The reaction mixture was filtered and dried in a vacuum oven at room temperature overnight at 133.3 Pa (1 mm Hg) to give the desired product. Yield: 8.4 grams.

Preparative Example 6

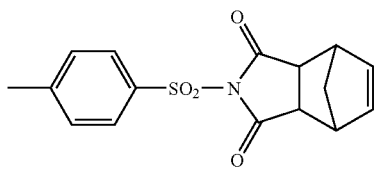

In a glass reaction vessel fitted with a pressure-equalizing addition funnel and a nitrogen inlet was placed a 60 weight percent dispersion of NaH in mineral oil (9.45 grams) and hexane (20 milliliters). The mixture was stirred for approximately 15 minutes and DMF (100 milliliters) was added. A mixture of p-toluenesulfonamide (15.7 grams) and 5-norbornene-2,3-dicarboxylic anhydride (16.2 grams) in DMF (100 milliliters) was slowly added to the flask via the addition funnel. The resulting mixture was allowed to stir overnight at room temperature. A solution of 5-norbornene-2,3-dicarboxylic anhydride (1.6 grams) in DMF (10 milliliters) was added dropwise to the flask and the mixture was stirred for approximately 6 hours. Acetic anhydride (28.14 grams) was added to the flask and the mixture was stirred overnight. Aqueous NaHCO$_3$ solution was added, followed by aqueous HCl. The mixture was filtered and the filtered solid was dried overnight using a vacuum oven and recrystallized from methanol to give the desired product. Yield: 14.8 grams.

Preparative Example 7

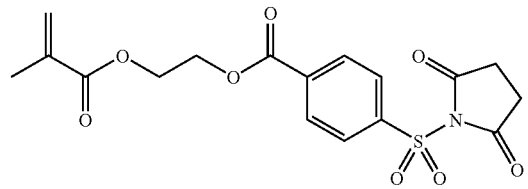

In a glass reaction vessel a mixture of NMP (9.11 milliliters), 2-hydroxyethyl methacrylate (0.78 grams) and a sample of the carbonyl chloride product of Preparative Example 2 (1.50 grams) were combined and stirred overnight at room temperature. The mixture was poured into 0.1N HCl and the resultant solid was collected by filtration, washed with deionized water, and dried in a vacuum oven at room temperature overnight at 133.3 Pa (1 mm Hg) to give the desired product. Yield: 1.53 grams.

Preparative Example 8

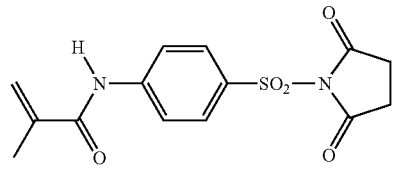

In a glass reaction vessel fitted with a reflux condenser was placed a solution of a sample of the product of Preparative Example 5 (6.00 grams) succinic anhydride (2.75 grams), triethylamine (3.34 grams) in ACN (40 milliliters) with a trace of phenothiazine. This mixture was refluxed for 6 hours, cooled to room temperature, succinic anhydride (3.25 grams) and triethylamine (6.11 grams) were added and the mixture was refluxed for 1 hour. The mixture was poured into 0.1N aqueous HCl and the resultant solid was collected by filtration, washed with deionized water, and dried in a vacuum oven at room temperature overnight at 133.3 Pa (1 mm Hg) to give the desired product. Yield: 5.9 grams.

Preparative Example 9

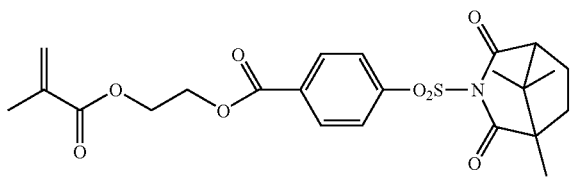

In a glass reaction vessel a solution of 2-hydroxyethyl methacrylate (0.68 grams) and a sample of the carbonyl chloride product of Preparative Example 4 (1.68 grams) in NMP (9.45 milliliters) was stirred overnight at room temperature. The mixture was poured into aqueous 0.1N HCl and extracted with ethyl acetate. The organic phase was washed successively with deionized water and saturated aqueous NaCl and dried over $MgSO_4$. The solution was concentrated using a rotary evaporator and dried overnight in a vacuum oven at room temperature and 67 Pa (0.5 mm Hg) to give the desired product. Yield: 1.8 grams.

Preparative Example 10

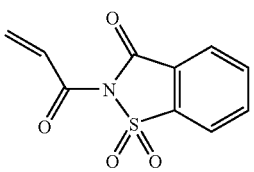

In a glass reaction vessel was placed a slurry of Na saccharin (dried by azeotroping with toluene) (20.5 grams) in acetone (150 milliliters). To this stirred slurry was added acryloyl chloride (9.2 grams) and the resulting mixture was stirred for 24 hours. The mixture was filtered and the solvent was removed to give 18.3 grams of insoluble and 9.5 grams of soluble white solids which were identical by IR spectroscopy. The soluble and insoluble solids were recombined in 400 milliliters of water, filtered and dried to give the desired product with about 80% purity by NMR. Yield: 20.5 grams. The solid was slightly soluble in EtOAc and soluble in NMP.

Preparative Example 11

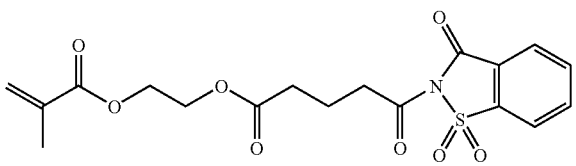

In a glass reaction vessel a solution of 2-hydroxyethyl methacrylate (22.31 grams), glutaric anhydride (20.54 grams) and triethylamine (19.08 grams) in dry THF (167.5 milliliters) were stirred overnight at room temperature. The solution was concentrated using a rotary evaporator and the residue was dissolved in 400 milliliters of EtOAc The organic phase was washed successively with deionized water, saturated aqueous NaCl and dried over $MgSO_4$. The solution was filtered, treated with thionyl chloride (21.14 grams) and DMF (3 drops) in a glass reaction vessel. The mixture was stirred overnight and concentrated on a rotary evaporator. The concentrate was slowly added to a stirred suspension of dry Na saccharin (31.29 grams) in dry acetone (250 milliliters) chilled in an ice bath. The mixture was stirred overnight and allowed to warm to room temperature. The mixture was filtered, the filtrate was concentrated and slurried in chloroform, and filtered again. The filtrate was concentrated, diethyl ether was added and the precipitate was isolated by filtration and dried under a stream of nitrogen gas to give the desired product. Yield: 40.5 grams.

Example 1

In a glass bottle, 1.0 gram of the product of Preparative Example 7, 8.0 grams of methyl methacrylate, 1.0 gram of 3-methacryloxypropyl trimethoxysilane and 30 grams of EtOAc were mixed. To this mixture, 102 milligrams of VAZO 67 was added. The bottle was made inert with nitrogen gas and sealed. The sealed bottle was tumbled in a 60° C. water bath for 24 hours.

Example 2

In a glass bottle, 1.0 gram of the product of Preparative Example 7, 3.5 grams of methyl methacrylate, 0.5 grams of 3-methacryloxypropyl trimethoxysilane, 0.8 grams of 3-mercaptopropyl trimethoxysilane, and 20 grams of EtOAc were mixed. To this mixture, 100 milligrams of VAZO 67 was added. The bottle was made inert with nitrogen gas and sealed. The sealed bottle was tumbled in a 60° C. water bath for 24 hours.

Example 3

In a glass bottle, 1.0 gram of the product of Preparative Example 7, 2.0 grams of methyl methacrylate, 0.5 grams of 3-mercaptopropyl trimethoxysilane, and 20 grams of EtOAc were mixed. To this mixture, 101 milligrams of VAZO 67 was added. The bottle was made inert with nitrogen gas and sealed. The sealed bottle was tumbled in a 60° C. water bath for 24 hours.

Example 4

In a glass bottle, 2.0 grams of the product of Preparative Example 10, 8.0 grams of methyl acrylate, 10 grams of N-methylpyrrolidone, and 20 grams of EtOAc were mixed. To this mixture, 70 milligrams of VAZO 67 was added. The bottle was made inert with nitrogen gas and sealed. The sealed bottle was tumbled in a 60° C. water bath for 24 hours.

Example 5

In a glass bottle, 2.0 grams of the product of Preparative Example 10, 8.0 grams of methyl acrylate, and 10 grams of NMP were mixed. To this mixture, 70 milligrams of VAZO 67 was added. The bottle was made inert with nitrogen gas and sealed. The sealed bottle was tumbled in a 60° C. water bath for 24 hours.

Example 6

In a glass bottle, 2.0 grams of the product of Preparative Example 10, 8.0 grams of methyl methacrylate, and 20 grams of NMP were mixed. To this mixture, 65 milligrams of VAZO 67 was added. The bottle was made inert with nitrogen gas and sealed. The sealed bottle was tumbled in a 60° C. water bath for 24 hours.

Example 7

In a glass bottle, 1.0 gram of the product of Preparative Example 7, 8.0 grams of methyl methacrylate, 1.0 grams of 3-methacryloxypropyltrimethoxysilane and 30 grams of EtOAc were mixed. To this mixture, 102 milligrams of VAZO 67 was added. The bottle was made inert with nitrogen gas and sealed. The sealed bottle was tumbled in a 60° C. water bath for 24 hours.

Example 8

In a glass bottle, 1.0 gram of the product of Preparative Example 7, 3.5 grams of methyl methacrylate, 0.5 grams of 3-methacryloxypropyltrimethoxysilane, 0.8 grams of 3-mercaptopropyltrimethoxysilane and 20 grams of EtOAc were mixed. To this mixture, 100 milligrams of VAZO 67 was added. The bottle was made inert with nitrogen gas and sealed. The sealed bottle was tumbled in a 60° C. water bath for 24 hours.

Example 9

In a glass bottle, 1.0 gram of the product of Preparative Example 7, 2.0 grams of methyl methacrylate, 0.5 grams of 3-mercaptopropyltrimethoxysilane and 20 grams of EtOAc were mixed. To this mixture, 101 milligrams of VAZO 67 was added. The bottle was made inert with nitrogen gas and sealed. The sealed bottle was tumbled in a 60° C. water bath for 24 hours.

Example 10

In a glass bottle, 0.24 grams of the product of Preparative Example 6, 4.8 grams of N,N-dimethyl acrylamide, 4.6 grams of ACN and 3.0 grams of THF were mixed. To this mixture, 50 milligrams of VAZO 67 was added. The bottle was made inert with nitrogen gas and sealed. The sealed bottle was tumbled in a 60° C. water bath for 24 hours.

Example 11

In a glass bottle, 0.295 grams of the product of Preparative Example 7, 4.8 grams of N,N-dimethyl acrylamide, 6.9 grams of ACN and 0.8 grams of THF were mixed. To this mixture, 51 milligrams of VAZO 67 was added. The bottle was made inert with nitrogen gas and sealed. The sealed bottle was tumbled in a 60° C. water bath for 24 hours.

Example 12

In a glass bottle, 0.17 grams of the product of Preparative Example 8, 2.7 grams of N,N-dimethyl acrylamide, 0.017 grams of 3-mercaptopropyltrimethoxysilane and 4.3 grams of ACN were mixed. To this mixture, 29 milligrams of VAZO 67 was added. The bottle was made inert with nitrogen gas and sealed. The sealed bottle was tumbled in a 60° C. water bath for 24 hours.

Example 13

In a glass bottle, 0.33 grams of the product of Preparative Example 9, 0.87 grams of N,N-dimethyl acrylamide, 1.6 grams of ACN and 0.2 grams of THF were mixed. To this mixture, 12 milligrams of VAZO 67 was added. The bottle was made inert with nitrogen gas and sealed. The sealed bottle was tumbled in a 60° C. water bath for 24 hours.

Example 14

In a glass bottle, 1.00 gram of the product of Preparative Example 11, 1.50 grams of methyl acrylate, 6.75 grams of ACN and 0.75 grams of THF. To this mixture, 17.5 milligrams of VAZO 67 was added. The bottle was made inert with nitrogen gas and sealed. The sealed bottle was tumbled in a 55° C. water bath for 24 hours.

Example 15

In a glass bottle, 1.00 gram of the product of Preparative Example 11, 4.00 grams of methyl methacrylate, 0.025 grams of acryloxybenzophenone, 6.75 grams of ACN and 0.75 grams of THF. To this mixture, 17.5 milligrams of VAZO 67 was added. The bottle was made inert with nitrogen gas and sealed. The sealed bottle was tumbled in a 55° C. water bath for 24 hours.

Example 16

In a glass bottle, 1.50 grams of the product of Preparative Example 11, 1.50 grams of N,N-dimethyl acrylamide, 6.75 grams of ACN and 0.75 grams of THF. To this mixture, 17.5 milligrams of VAZO 67 was added. The bottle was made inert with nitrogen gas and sealed. The sealed bottle was tumbled in a 55° C. water bath for 24 hours Example 17

In a glass bottle, 1.00 gram of the product of Preparative Example 11, 3.00 grams of methyl methacrylate, 1.00 gram of isobornyl methacrylate, 0.025 grams of 4-acryloxybenzophenone, 13.50 grams of ACN and 1.50 grams of THF. To this mixture, 17.5 milligrams of VAZO 67 was added. The bottle was made inert with nitrogen gas and sealed. The sealed bottle was tumbled in a 55° C. water bath for 24 hours.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A soluble polymer prepared from at least one monomer of the formula:

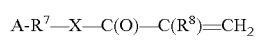

wherein A is selected from the group consisting of functional groups having the following formulas:

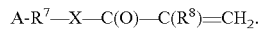
(I)

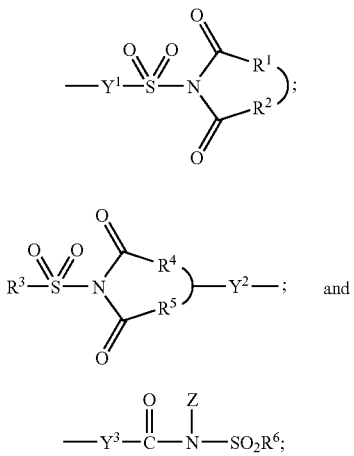
(II)

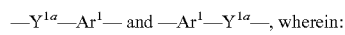
and (IV)

—Y³—C(O)—N(Z)—SO₂R⁶;

wherein:
- R¹ and R² together with a dicarboximide group to which they are attached form a four to eight membered heterocyclic or heterobicyclic group that can be fused to an optional aromatic group, optional saturated or unsaturated cyclic group, or optional saturated or unsaturated bicyclic group;
- R³ is an alkyl, aryl, aralkyl, or —NR$^a$R$^b$ wherein R$^a$ and R$^b$ are each an alkyl group or taken together with the nitrogen atom to which they are attached form a four to eight membered heterocyclic group;
- R⁴ and R⁵ together with a dicarboximide group to which they are attached form a four to eight membered heterocyclic or heterobicyclic group that can be fused to an optional aromatic group, optional saturated or unsaturated cyclic group, or optional saturated or unsaturated bicyclic group;
- R⁶ is an alkyl, fluoroalkyl, chloroalkyl, aryl, —NR$^c$R$^d$ wherein R$^c$ and R$^d$ are each an alkyl group or taken together with the nitrogen atom to which they are attached form a four to eight membered cyclic group, or R⁶ taken together with R$^e$ and the groups to which they are attached form the four to eight membered heterocyclic or heterobicyclic group that can be fused to the optional aromatic group, optional saturated or unsaturated cyclic group, or optional saturated or unsaturated bicyclic group;
- Z is an alkyl, aryl, or —(CO)R$^e$ wherein R$^e$ together with R⁶ and groups to which they are attached form a four to eight membered heterocyclic or heterobicyclic group having a nitrogen heteroatom and a sulfur heteroatom, wherein said heterocyclic or heterobicyclic group can be fused to an optional aromatic group, optional saturated or unsaturated cyclic group, or optional saturated or unsaturated bicyclic group;
- Y¹, Y², and Y³ are each independently a single bond or a divalent group selected from the group consisting of an alkylene, heteroalkylene, arylene, carbonyl, carbonyloxy, carbonylimino, oxy, thio, —NR$^f$— where R$^f$ is hydrogen or alkyl, and combinations thereof;
- X is —N(R⁹)— or —O—;
- R⁷ is a divalent group selected from the group consisting of alkylene, heteroalkylene, arylene, heteroarylene, and combinations thereof, wherein the alkylene and heteroalkylene optionally include one or more carbonyls;
- R⁸ is hydrogen or methyl; and
- R⁹ is hydrogen or a C$_{1-6}$ alkyl group.

2. The soluble polymer of claim 1 wherein the polymer is prepared from two to four different (meth)acrylate monomers, wherein at least one monomer is of the formula:

A-R⁷—X—C(O)—C(R⁸)=CH₂.

3. The soluble polymer of claim 1 wherein Y¹, Y² and Y³ are each independently selected from the group consisting of the formula —Y$^{1a}$—Ar¹— and —Ar¹—Y$^{1a}$—, wherein:

Ar¹ is an arylene; and
Y$^{1a}$ is selected from the group consisting of a single bond, alkylene, heteroalkylene, carbonyl, carbonyloxy, carbonylimino, oxy, thio, —NR$^f$— where R$^f$ is hydrogen or alkyl, and combinations thereof.

4. The soluble polymer of claim 1 wherein Y¹, Y² and Y³ each independently comprises a first alkylene group linked to an arylene group with a group selected from the group consisting of a carbonyl, carbonyloxy, carbonylimino, oxy, thio, —NR$^f$— where R$^f$ is hydrogen or alkyl, and combinations thereof.

5. The soluble polymer of claim 1 wherein Y¹, Y² and Y³ each independently comprises a first heteroalkylene group linked to an arylene with a group selected from the group consisting of a carbonyl, carbonyloxy, carbonylimino, oxy, thio, —NR$^f$— where R$^f$ is hydrogen or alkyl, and combinations thereof.

6. The soluble polymer of claim 1 wherein Y¹, Y² and Y³ each independently comprises a first alkylene group connected to a second alkylene group or to a first heteroalkylene group with a group selected from the group consisting of a carbonyl, carbonylimino, carbonyloxy, oxy, thio, —NR$^f$— where R$^f$ is hydrogen or alkyl, and combinations thereof.

7. The soluble polymer of claim 1 wherein Y¹, Y² and Y³ each independently comprises a first heteroalkylene group connected to a second heteroalkylene group or to a first alkylene group with a group selected from the group consisting of a carbonyl, carbonylimino, carbonyloxy, oxy, thio, —NR$^f$— where R$^f$ is hydrogen or alkyl, and combinations thereof.

8. The soluble polymer of claim 1 wherein Y¹, Y² and Y³ are each independently a heteroalkylene having 1-30 carbon atoms and up to 30 heteroatoms selected from the group consisting of N, O, S, and combinations thereof, wherein the heteroalkylene group is linear, branched, cyclic, or combinations thereof.

9. The soluble polymer of claim 1 wherein Y¹, Y² and Y³ are each independently an alkylene having 1-30 carbon atoms, wherein the alkylene group is linear, branched, cyclic, or combinations thereof.

10. The soluble polymer of claim 1 wherein Y¹, Y² and Y³ each independently comprises an arylene group in addition to one or more alkylene groups and one or more heteroalkylene groups.

11. The soluble polymer of claim 1 wherein A is selected from the group consisting of functional groups having the following formulas:

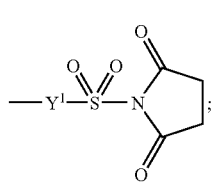

-continued

[chemical structure]

[chemical structure]

[chemical structure]

[chemical structure]

[chemical structure]

[chemical structure]

[chemical structure]

[chemical structure]

wherein each R is independently an alkyl group.

12. The soluble polymer of claim 1 wherein A is selected from the group consisting of functional groups having the following formulas:

[chemical structure]

[chemical structure]

wherein:
v is an integer of 1 to 200;
x is an integer of 1 to 4; and
D is oxygen, sulfur, or NH.

13. The soluble polymer of claim 1 wherein Z is an alkyl or aryl group.

14. The soluble polymer of claim 1 wherein Z is a —(CO) $R^e$ group that together with $R^3$ and groups to which they are attached form a four to eight membered heterocyclic or heterobicyclic group having a nitrogen heteroatom and a sulfur heteroatom, wherein said heterocyclic or heterobicyclic group can be fused to an optional aromatic group, optional saturated or unsaturated cyclic group, or optional saturated or unsaturated bicyclic group.

15. The soluble polymer of claim 1 wherein A has the following formula:

[chemical structure]

16. A method of making a soluble polymer, the method comprising polymerizing monomers, wherein at least one monomer is a compound of the formula:

$$A-R^7-X-C(O)-C(R^8)=CH_2$$

wherein A is selected from the group consisting of functional groups having the following formulas:

(I)
[chemical structure]

(II)
[chemical structure]
and

(IV)

wherein:
- $R^1$ and $R^2$ together with a dicarboximide group to which they are attached form a four to eight membered heterocyclic or heterobicyclic group that can be fused to an optional aromatic group, optional saturated or unsaturated cyclic group, or optional saturated or unsaturated bicyclic group;
- $R^3$ is an alkyl, aryl, aralkyl, or —$NR^aR^b$ wherein $R^a$ and $R^b$ are each an alkyl group or taken together with the nitrogen atom to which they are attached form a four to eight membered heterocyclic group;
- $R^4$ and $R^5$ together with a dicarboximide group to which they are attached form a four to eight membered heterocyclic or heterobicyclic group that can be fused to an optional aromatic group, optional saturated or unsaturated cyclic group, or optional saturated or unsaturated bicyclic group;
- $R^6$ is an alkyl, fluoroalkyl, chloroalkyl, aryl, —$NR^cR^d$ wherein $R^c$ and $R^d$ are each an alkyl group or taken together with the nitrogen atom to which they are attached form a four to eight membered cyclic group, or $R^6$ taken together with $R^e$ and the groups to which they are attached form the four to eight membered heterocyclic or heterobicyclic group that can be fused to the optional aromatic group, optional saturated or unsaturated cyclic group, or optional saturated or unsaturated bicyclic group;
- Z is an alkyl, aryl, or —(CO)$R^e$ wherein $R^e$ together with $R^6$ and groups to which they are attached form a four to eight membered heterocyclic or heterobicyclic group having a nitrogen heteroatom and a sulfur heteroatom, wherein said heterocyclic or heterobicyclic group can be fused to an optional aromatic group, optional saturated or unsaturated cyclic group, or optional saturated or unsaturated bicyclic group;
- $Y^1$, $Y^2$, and $Y^3$ are each independently a single bond or a divalent group selected from the group consisting of an alkylene, heteroalkylene, arylene, carbonyl, carbonyloxy, carbonylimino, oxy, thio, —$NR^f$— where $R^f$ is hydrogen or alkyl, and combinations thereof;
- X is —$N(R^9)$— or —O—;
- $R^7$ is a divalent group selected from the group consisting of alkylene, heteroalkylene, arylene, heteroarylene, and combinations thereof, wherein the alkylene and heteroalkylene optionally include one or more carbonyls;
- $R^8$ is hydrogen or methyl; and
- $R^9$ is hydrogen or a $C_{1-6}$ alkyl group.

* * * * *

UNITED STATES PATENT AND TRADEMARK OFFICE
CERTIFICATE OF CORRECTION

PATENT NO.         : 7,521,516 B2                                Page 1 of 2
APPLICATION NO.    : 11/968953
DATED              : April 21, 2009
INVENTOR(S)        : Karl E Benson It is certified that error appears in the above-identified patent and that said Letters Patent is hereby corrected as shown below:

Title page, item [75]
Column 1 (Inventors); Line 6, Delete "George G. I. Moora" and insert -- George G. I. Moore --, therefor.

Column 13
Line 52 (Approx.); Delete "-$L_q$-C(O)-$L_q$-" and insert -- –$L_q$–C(O) –$L_q$– --, therefor.

Column 15

Line 45-52 (Approx.); Delete " 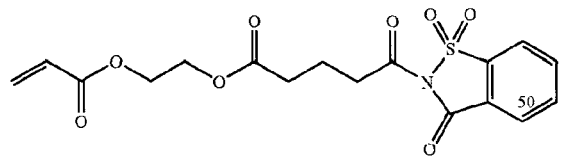 " and insert

-- 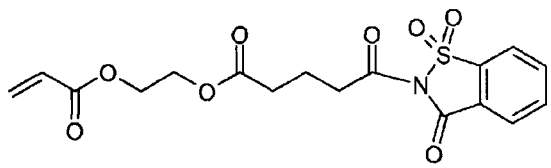 --, therefor.

Line 53-57 Delete " 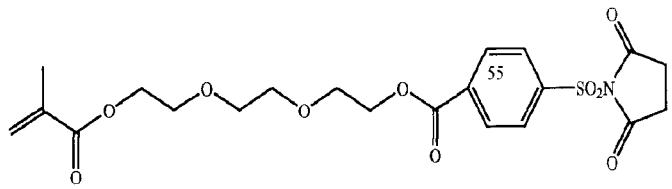 " and insert

Signed and Sealed this
Fifth Day of April, 2011

David J. Kappos
*Director of the United States Patent and Trademark Office*

CERTIFICATE OF CORRECTION (continued)
U.S. Pat. No. 7,521,516 B2

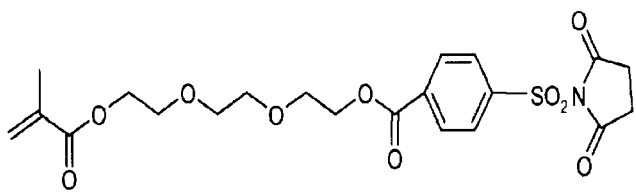

--                                                          --, therefor.

Column 18
Line 49; Delete "aryl)(meth)acrylates" and insert -- aryl) (meth)acrylates --, therefor.

Column 22
Line 64; Delete "gellation" and insert -- gelation --, therefor.

Column 24
Line 44; Delete "evaporater." and insert -- evaporator. --, therefor.

Column 30
Line 34; After "hours" insert -- . --.